United States Patent [19]

Jorephani

[11] 4,390,146
[45] Jun. 28, 1983

[54] APPARATUS SUITABLE FOR USE IN REMOVING OR REDUCING A CREASE OR TANGLE IN A MAGNETIC RECORDING TAPE OF A CASSETTE

[76] Inventor: Karim Jorephani, Basra Farm, Shockerwick La., Batheaston, Bath, Avon, England

[21] Appl. No.: 245,050

[22] Filed: Mar. 18, 1981

[30] Foreign Application Priority Data

Jul. 29, 1980 [GB] United Kingdom ................ 8024685
Aug. 15, 1980 [GB] United Kingdom ................ 8026667

[51] Int. Cl.³ ...................... B65H 27/00; G03B 1/04; G11B 15/32
[52] U.S. Cl. .................................... 242/200; 242/76; 162/271
[58] Field of Search ............................ 242/197–200, 242/76, 71.7, 55; 493/395; 162/270, 271; 226/196, 197

[56] References Cited

U.S. PATENT DOCUMENTS 1,654,946 1/1928 Sinks .................................. 162/271
2,359,612 10/1944 Bolsey ................................ 242/55
3,501,375 3/1970 Suzuki et al. ...................... 162/271
3,946,964 3/1976 Zinser ................................. 242/86
3,999,725 12/1976 Arbib ................................. 242/199
4,201,354 5/1980 Masiello et al. .................... 242/71.7

FOREIGN PATENT DOCUMENTS 1443628 7/1976 United Kingdom .

Primary Examiner—Leonard D. Christian
Attorney, Agent, or Firm—Pearne, Gordon, Session, McCoy, Granger & Tilberry

[57] ABSTRACT

An apparatus suitable for use in removing or reducing a crease or tangle in a magnetic recording tape of a cassette is disclosed, the apparatus comprising: a holder (1) capable of holding a cassette (5); a rotatable shaft (2) rotatably mounted with respect to the holder (1) and having a working region (22) capable of engaging the teeth (54) of a hub (52) of the cassette (5); rotating means (3) capable of rotating the shaft (2); and a guide member (4) provided with a slit (43) through which the tape (58) of the cassette (5) may be advanced upon rotation of the shaft (2) and hub (52). The apparatus is not expensive to produce, is easy to operate, and satisfactorily removes or reduces creases or tangle in a magnetic recording tape.

10 Claims, 7 Drawing Figures

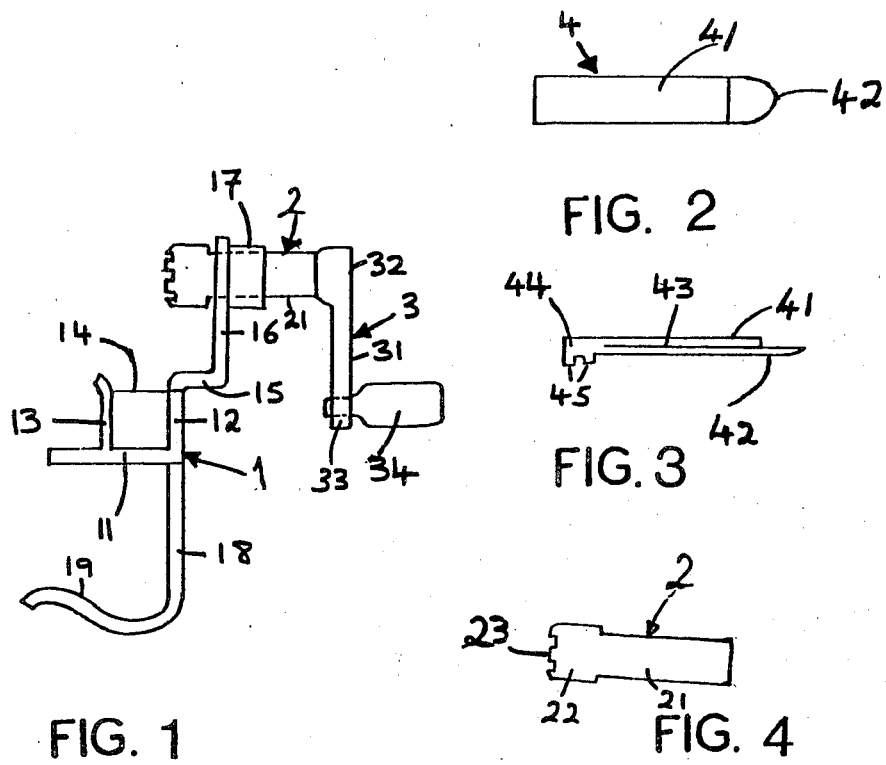
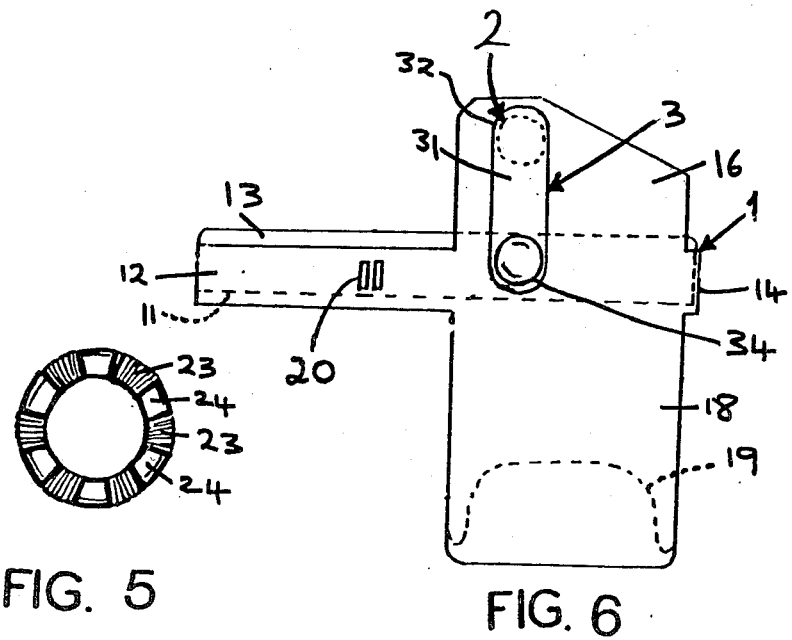

APPARATUS SUITABLE FOR USE IN REMOVING OR REDUCING A CREASE OR TANGLE IN A MAGNETIC RECORDING TAPE OF A CASSETTE

This invention relates to an apparatus suitable for use in removing or reducing a crease or tangle in a magnetic recording tape of a cassette. More particularly, but not exclusively, the present invention is concerned with an apparatus suitable for use with a cassette (referred to hereinbelow as a "cassette of the kind herein specified") comprising a generally rectangular casing which is approximately 100 mm long, 64 mm wide and 9 mm thick, and two hubs in the casing carrying magnetic recording tape and each arranged to rotate about a respective axis, the axes being parallel to one another and approximately 43 mm apart, there being two holes through the cassette, into which project inwardly directed teeth on the hubs for use in driving the hubs to transfer the tape from one hub to the other.

Damage to a tape can occur through bad handling or a badly maintained cassette-playing machine. Hitherto, when attempting to remove or reduce creases or tangles in the tape, a long, difficult and tedious operation often involves the use of match sticks and finger nails to wind and straighten out twisted tapes.

According to the present invention, there is provided an apparatus suitable for use in removing or reducing a crease or tangle in a magnetic recording tape of a cassette of the kind herein specified, the apparatus comprising:

a holder capable of holding a cassette of the kind herein specified;

a rotatable shaft rotatably mounted with respect to the holder and having a working region capable, in use, of engaging the teeth on one hub of the cassette when the cassette is correctly positioned in the holder;

rotating means capable of causing rotation of the shaft; and a guide member which is capable of being positioned adjacent the cassette in that edge region of the latter where the tape is exposed, and which is provided with a slit through which the tape may be advanced when the one hub of the cassette is rotated;

the arrangement being such that, in use, with a cassette correctly positioned in the holder, with the guide member correctly positioned relative to the cassette, with the tape located in the slit of the guide member, and with the working end of the shaft engaging the teeth on the one hub, actuation of the rotating means causes the tape to be advanced through the slit thereby removing or reducing a crease or tangle in the tape.

The four major components of the apparatus, namely the holder, the rotatable shaft, the rotating means and the guide member, may be separable from each other, which can assist storage and/or transportation. Alternatively, in order to prevent any component from becoming lost, the components can be so designed that the apparatus cannot be dismantled, whilst making adequate provision for the necessary relative movement between certain components.

Conveniently, but not necessarily, the holder comprises a base, a front wall perpendicular to the base, a rear wall parallel to the front wall, and an end wall, which together define a channel into which that edge region of the cassette opposite the edge region where the tape is exposed, can be introduced. Once the opposite edge region of the cassette abuts the base of the holder, the cassette can be moved along the channel until it abuts the end wall so that one of the two holes in the cassette is opposite the working region of the rotatable shaft or opposite the position at which the shaft is to be mounted.

The holder may optionally include a clamping portion so that, when the base of a holder is positioned on the upper surface of, for example, a table, the clamping portion can abut the underside of the table so as to hold the holder firmly with respect to the table.

Conveniently, but not necessarily, the rotatable shaft not only is rotatably mounted with respect to the holder but also is mounted to allow translational movement towards and away from the cassette when correctly positioned in the holder, so as to allow the working region of the shaft to enter a hole and with its teeth engage the teeth on the hub adjacent to that hole.

Optionally, the rotatable shaft may be removable from its mounting, so as to make the apparatus more compact when not in use.

The rotating means may be, for example, a handle intended to be attached to that end region of the shaft remote from the working region. If desired, the handle can be integral with the shaft; alternatively it can be detachable from the rotatable shaft so as to make the apparatus more compact for storage purposes. Instead of the rotating means being a manually operable handle or wheel, it could, as an alternative, be an electric motor or some other motor capable of causing rotation of the rotatable shaft.

The guide member may be permanently secured to the holder in order to avoid loss of the guide member; in particular, it may be of integral one piece construction with the holder. Alternatively, the guide member can be a separate element capable of being secured to the holder so as to keep it safe when the apparatus is not in use. The guide member is provided with a slit through which the tape may be advanced; the slit may be defined by two juxtaposed parallel strips projecting from a common head element. The head element may, in the case in which the guide member is separate from the holder, be provided with means both for securing the guide member to the cassette casing during use and for securing the guide member to the holder when the apparatus is not in use.

The apparatus of the present invention is conveniently formed of a plastics material, although it could be formed of an alternative material.

In the interests of economy, only one rotatable shaft is provided so that, when it is wished to advance the tape of a cassette in the opposite direction, it is necessary to remove the cassette from the holder, rotate the cassette through 180° whilst still keeping the exposed tape facing the same direction, and then re-introduce the cassette into the holder, so that the other of the two holes is then brought opposite the position in which the rotatable shaft is mounted.

It would, however, be possible for the holder of the apparatus to be provided with two mounting points at each of which the rotatable shaft or a respective rotatable shaft could be mounted and could be used to engage the hub opposite the respective mounting point. However, in the interests of economy, it is cheaper to provide only one mounting point at which the rotatable shaft is rotatably mounted.

In order to use the apparatus of the present invention, and assuming that the tape is fully wound on one hub, the cassette is inserted into the holder with the other hub opposite the rotatable shaft. An exposed region of the tape is then pulled slightly out of the cassette and forced into the slit of the guide member which, unless already secured relative to the cassette or holder, is now suitably secured. The working region of the rotatable shaft is then, if not already, engaged with the teeth of the other hub, and then rotation of the rotating means in the appropriate direction causes rotation of the shaft and hence of the other hub so as to cause the tape to be wound from the one hub to the other hub, thus causing the tape to pass through the slit of the guide member. The characteristics of the guide member may be such that the two regions of the guide member defining the slit exert a slight pressure on the tape as it passes therethrough. In order to increase pressure on the tape, finger pressure on part of the guide member can cause a greater pressure to be exerted on the tape during its passage through the slit.

For a better understanding of the present invention and to show how the same may be carried into effect, reference will now be made, by way of example, to the accompanying drawings, in which:

FIG. 1 is an end elevation of the holder, rotatable shaft, and rotating means forming three components of one embodiment of an apparatus according to the present invention;

FIG. 2 is a plan view of a guide member constituting another component of the embodiment of the apparatus partially illustrated in FIG. 1;

FIG. 3 is a side view of the guide member of FIG. 2;

FIG. 4 is a side view of the rotatable shaft shown in FIG. 1;

FIG. 5 is an end view, on an enlarged scale, of the working region of the shaft shown in FIG. 4;

FIG. 6 is a front elevation of the apparatus illustrated in FIG. 1; and

Figure 7:
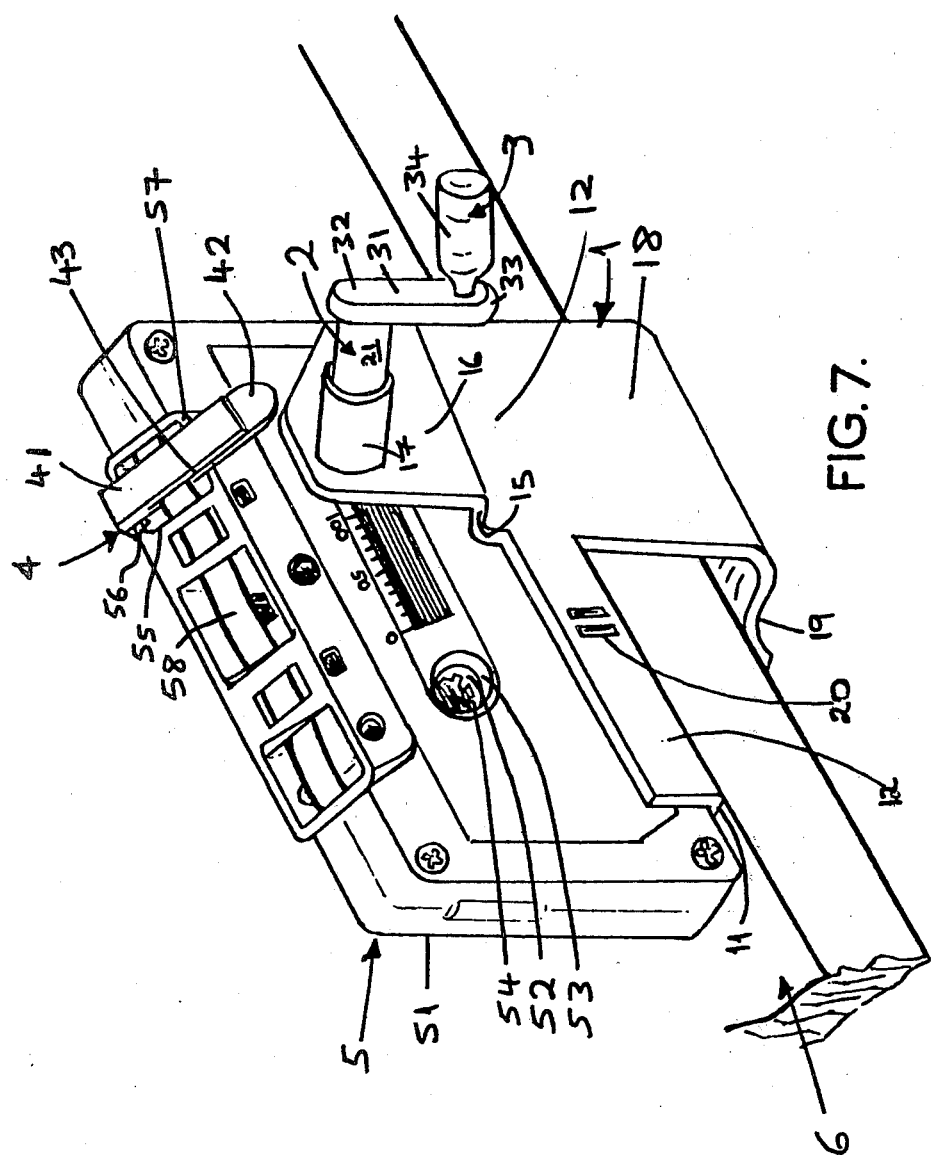
FIG. 7 is a perspective view, from the front and from above, of the apparatus of FIG. 1, with a cassette held in the holder and with the guide member of FIG. 2 secured to the cassette.

The apparatus illustrated in the drawings comprises four major components, namely a holder 1, a rotatable shaft 2, a handle 3 (all three of which are shown in at least FIG. 1), and a guide member 4 (shown in FIG. 2). Other major items illustrated in FIG. 7 of the drawings are a cassette 5 and a table 6.

Referring in particular to FIGS. 1 and 6 of the drawings, the holder 1 has a base 11 upstanding from which are a front wall 12 and, parallel thereto and spaced therefrom, a rear wall 13. The base 11, front wall 12 and rear wall 13 define a channel closed at one end by an end wall 14 which extends from the front wall 12 to the rear wall 13.

Projecting forwardly from an upper region of the front wall 12 is a horizontal spacing element 15 which carries an upward extension 16 parallel to, and in front of, the front wall 12.

Provided in the upward extension 16 is a hole (not shown) adjacent which is a collar 17 on the forward-facing side of the upward extension 16, the hole through the collar corresponding to that through the upward extension 16.

Projecting downwardly from a lower region of the front wall 12 is a downward extension 18 which runs into a clamping portion 19 which, in conjunction with the base 12, is capable of securing the holder 1 to a parallel-sided body, such as the edge of a table 6 (shown in FIG. 7).

The front wall 12 of the holder 1 is provided with a pair of parallel recesses 20 used for securing the guide means 4 when not in use.

The rotatable shaft 2 has a main shaft portion 21 at one end region of which is a head 22 provided with spaced teeth 23 capable of engaging the teeth on a hub of a cassette while the latter teeth occupy spaces 24 between teeth 23.

The handle 3 comprises an arm 31 capable of being fixedly secured at one end region 32 to that end region of the shaft portion 21 remote from the head 22. At the opposite end region 33 of the arm 31, there is provided a manually rotatable grip 34 of which the axis is parallel to, but displaced from, that of the shaft portion 21.

The guide member 4 comprises a first strip 41 and juxtaposed and parallel thereto a slightly longer second strip 42, the two strips 41 and 42 defining therebetween a slit 43 and terminating at one end thereof in a head 44 provided with two projections 45 capable of being accommodated in the pair of parallel recesses 20 in the front wall 12 of the holder 1.

The cassette 5 illustrated in FIG. 7 is of conventional design and comprises a casing 51, two spaced-apart hubs of which only one, 52, is shown, two holes passing through the cassette in the region of the hubs of which only one hole, 53, is shown, teeth 54 on the hub 52, an opening 55 in one edge region of the cassette 5, the opening being partially defined by a first wall 56 and a second, opposing wall 57, and the tape 58 which is visible through the opening 55 and four other openings.

The method of using the apparatus illustrated in the drawings will now be described.

Assume that the tape 58 of the cassette 5 is creased and assume that, to start with, the tape is wound on the left hand hub 52 of the cassette illustrated in FIG. 7.

The cassette is pushed into the channel defined by the base 11, and front and rear walls 12 and 13, until the lower edge region of the cassette 5 abuts the base 11. The cassette 5 is then pushed to the right (in FIG. 7) until its upright edge abuts the end wall 14. At this stage the right hand hole and hub (not shown) of the cassette should be opposite the hole and collar 17 of the holder 1. The rotatable shaft 2 is translationally movable along its axis and, in order to allow the cassette 5 to be inserted into the aforementioned channel, the shaft 2 is moved outwards, i.e. towards the front of the apparatus. Then, when the cassette 5 is correctly positioned in the holder, the shaft 2 is pushed inwards so that the teeth 23 on the head 22 of the shaft 2 engage the teeth on the hub masked in FIG. 7 by the upward extension 16, but which are identical to the teeth 54 of the left hand hub 52. If not already secured to the shaft 2, the handle 3 is now secured thereto.

The guide member 4 is then removed from the front wall 12 of the holder 1 and the two strips 41 and 42 are held slightly spaced apart whilst the tape 58 is moved into the slit 43.

Thereafter the strips 41 and 42 are released and the two projections 45 are forced down on opposite sides of the first wall 56 so that the guide member 4 is held securely relative to the casing 51.

The handle 3 is then rotated clockwise thus causing clockwise rotation of the shaft 2 and of the right hand hub of the cassette 5, thereby causing the tape 58 to be wound from the left hand hub 52 to the right hand hub, passing through the slit 43 of the guide member 4 on its way. In order to increase pressure on the tape 58 during a crease-removing operation, finger pressure can be applied to the upper strip 41.

If it is then wished to rewind the tape 58, the guide member 4 is removed, the shaft 2 moved forwardly and the cassette 5 removed from the channel. The cassette 5 is then rotated through 180° about its vertical axis and then re-located in the channel, after which the shaft 2 is moved rearwardly to cause the teeth 23 on the head 22 to engage the teeth 52 of that hub which was originally at the left hand side of FIG. 7.

If desired, the guide member 4 can be reemployed for the rewinding process, otherwise it can be returned to its rest position 20 on the front wall 12 of the holder 1.

I claim:

1. An apparatus suitable for use in removing or reducing a crease or tangle in a magnetic recording tape of a cassette, the cassette having a casing in which are two hubs carrying magnetic tape with a portion of the tape being exposed in an edge region of the cassette, each hub being arranged to rotate about a respective axis and the two axes being parallel to each other, the cassette being provided with two holes passing therethrough on said axes, the hubs having inwardly directed teeth which project into the respective holes, the teeth being used in driving the hubs to transfer the tape from one hub to the other, the apparatus comprising:

a holder capable of holding the cassette;

a rotatable shaft rotatably mounted with respect to the holder and having a working region in which are spaced apart teeth capable, in use, of engaging the teeth on one hub of the cassette when the cassette is correctly positioned in the holder;

rotating means capable of causing rotation of the shaft; and a guide member which is capable of being positioned adjacent the cassette in the edge region of the latter where the tape is exposed, the guide member being provided with a slit through which the tape may be advanced when the one hub of the cassette is rotated;

the arrangement being such that, in use, with a cassette correctly positioned in the holder, with the guide member correctly positioned relative to the cassette, with the tape located in the slit of the guide member, and with the working region of the shaft engaging the teeth on the one hub, actuation of the rotating means causes the tape to be advanced through the slit thereby removing or reducing a crease or tangle in the tape.

2. An apparatus according to claim 1, wherein the holder comprises a base, a front wall perpendicular to the base, and, parallel to the front wall, a rear wall, which together define a channel for receiving an edge region of the cassette.

3. An apparatus according to claim 2, wherein the front wall has an upward extension provided with a hole at a position opposite the axis of a hub of the cassette when the latter is correctly positioned in the holder.

4. An apparatus according to claim 2, wherein the holder is provided with a downward extension having to a clamping portion capable, in conjunction with the base, of securing the holder to a parallel-sided body.

5. An apparatus according to claim 2, wherein the holder includes an end wall extending between the front and rear walls and perpendicular to the base.

6. An apparatus according to claim 1, wherein at least one of the holder, rotatable shaft, rotating means and guide member is separable from the apparatus, the guide member including means for releasably securing it to the holder, the rotating means including attachment means for releasably securing it to the rotatable shaft.

7. An apparatus according to claim 1, wherein the holder, rotatable shaft, rotating means and guide member are secured together by means permitting limited relative movement between some of these components, with the guide member being integral with the holder.

8. An apparatus according to claim 1, wherein the rotatable shaft includes means for mounting it for translational movement relative to the holder, whereby, in use, with a cassette correctly positioned within the holder, the working region of the rotatable shaft may be brought into and out of engagement with the teeth on a hub of the cassette.

9. An apparatus according to claim 1, wherein the rotating means is selected from the group consisting of (a) a handle comprising an arm of which one end region includes means for fixedly securing the one end region to the rotatable shaft and of which the other end region is provided with a manually rotatable grip, and (b) a motor capable of rotating the rotatable shaft.

10. An apparatus according to claim 1, wherein the guide member comprises two juxtaposed parallel strips which define therebetween a slit, and a common head region to which the parallel strips are joined.

* * * * *

UNITED STATES PATENT AND TRADEMARK OFFICE
CERTIFICATE OF CORRECTION

PATENT NO. : 4,390,146
DATED : June 28, 1983
INVENTOR(S) : Karim Jorephani

It is certified that error appears in the above—identified patent and that said Letters Patent is hereby corrected as shown below:

Please amend the title of the subject application to read --APPARATUS FOR REMOVING A CREASE OR TANGLE IN THE MAGNETIC TAPE OF A CASSETTE--.

IN THE CLAIMS:

Column 6, line 15, delete "to"

Signed and Sealed this

Thirteenth Day of September 1983

|SEAL|

Attest:

Attesting Officer

GERALD J. MOSSINGHOFF

Commissioner of Patents and Trademarks